United States Patent
Durham, III et al.

(10) Patent No.: US 10,848,476 B2
(45) Date of Patent: *Nov. 24, 2020

(54) MOBILE VOTING AND VOTING VERIFICATION SYSTEM AND METHOD

(71) Applicant: Global Mobile, LLC, Atlanta, GA (US)

(72) Inventors: Lee Ballinger Durham, III, Sandy Springs, GA (US); Scott Hughes, Dublin, OH (US)

(73) Assignee: Global Mobile, LLC, Atlanta, GA (US)

( * ) Notice: Subject to any disclaimer, the term of this patent is extended or adjusted under 35 U.S.C. 154(b) by 162 days.

This patent is subject to a terminal disclaimer.

(21) Appl. No.: 16/214,788

(22) Filed: Dec. 10, 2018

(65) Prior Publication Data

US 2019/0114861 A1 Apr. 18, 2019

Related U.S. Application Data

(63) Continuation-in-part of application No. 16/012,268, filed on Jun. 19, 2018, now Pat. No. 10,187,372, which is a continuation-in-part of application No. 15/265,938, filed on Sep. 15, 2016, now Pat. No. 10,027,647.

(60) Provisional application No. 62/220,015, filed on Sep. 17, 2015.

(51) Int. Cl.
| | |
|---|---|
| *H04W 12/06* | (2009.01) |
| *H04L 29/06* | (2006.01) |
| *G07C 13/00* | (2006.01) |
| *H04W 12/10* | (2009.01) |

(52) U.S. Cl.
CPC .............. *H04L 63/08* (2013.01); *G07C 13/00* (2013.01); *H04L 63/083* (2013.01); *H04L 63/0861* (2013.01); *H04L 63/0876* (2013.01); *H04L 63/126* (2013.01); *H04W 12/06* (2013.01); *H04W 12/10* (2013.01); *G06Q 2230/00* (2013.01)

(58) Field of Classification Search
None
See application file for complete search history.

(56) References Cited

U.S. PATENT DOCUMENTS

| | | | | |
|---|---|---|---|---|
| 2001/0037234 | A1* | 11/2001 | Parmasad | G06Q 10/10 705/12 |
| 2012/0330732 | A1* | 12/2012 | Kaplan | G06Q 10/00 705/12 |
| 2014/0270401 | A1* | 9/2014 | Irwin | G06Q 30/0185 382/115 |

FOREIGN PATENT DOCUMENTS

WO   WO 2002045396 A2 * 6/2002 .............. H04M 3/42

* cited by examiner

*Primary Examiner* — Steven S Kim
*Assistant Examiner* — Jason B Fenstermacher
(74) *Attorney, Agent, or Firm* — Burr & Forman LLP; Ryan M. Corbett

(57) ABSTRACT

A mobile voting system and method are provided. The mobile voting system may include a mobile messaging aggregator configured to receive voter verification requests from one or more mobile carriers, and a mobile voter verification server configured to verify a voter's identity in response to a voter verification request and generate a link to a mobile ballot once the voter's identity has been verified. The mobile messaging aggregator may cause the link to the mobile ballot to be transmitted to a mobile device of the voter, which when selected by the voter, allows the voter to cast a vote.

22 Claims, 3 Drawing Sheets

Mobile Verification and Voting

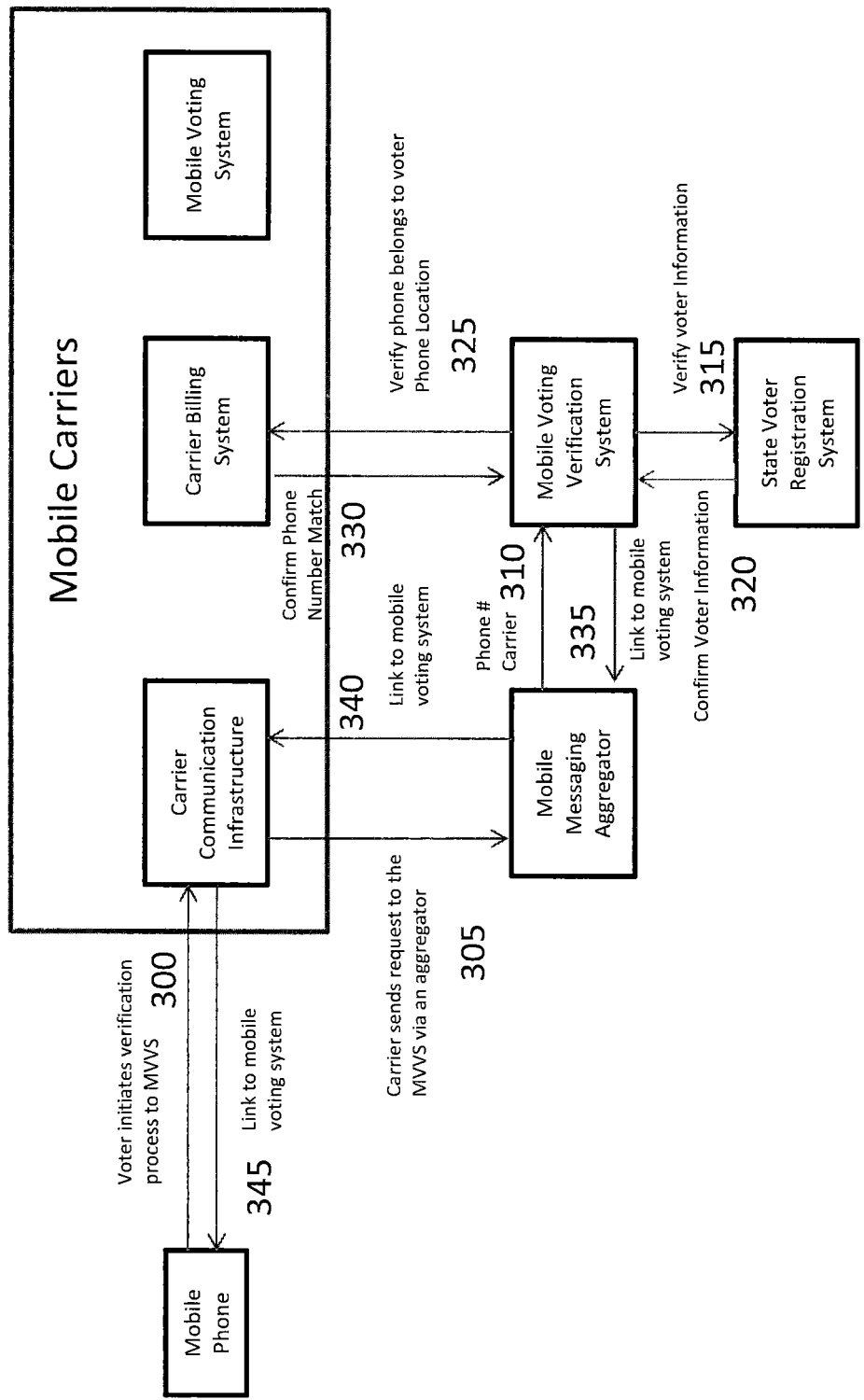

MOBILE VOTING AND VOTING VERIFICATION SYSTEM AND METHOD

CROSS-REFERENCE TO RELATED APPLICATION

This application is a continuation-in-part application of U.S. patent application Ser. No. 16/012,268, filed Jun. 19, 2018, which is a continuation-in-part application of U.S. patent application Ser. No. 15/265,938, filed Sep. 15, 2016 and issued as U.S. Pat. No. 10,027,647 on Jul. 17, 2018, which claims the benefit of U.S. Provisional Patent Application No. 62/220,015, filed on Sep. 17, 2015, all of which are incorporated herein by reference in their entirety.

TECHNICAL FIELD

The present disclosure relates generally to a system that provides voter verification for in-person voting, and that enables voters to securely and remotely submit votes in an election.

SUMMARY

The voting process in the United States has remained largely unchanged for decades. Voters typically arrive at polling locations before or after work hours in order to cast their votes for a variety of elected offices. Voters often wait in long lines while election volunteers verify each voter's name and address by comparing the voter's identification, such as a driver's license, to information on file at various municipal, state, or federal government agencies. Once verified, the voter is provided a paper ballot to complete, or is directed to an electronic voting terminal to cast his or her vote. Although election officials have recently incorporated absentee ballots and early voting periods as a way to improve the voting system, the traditional voting system is time consuming and inconvenient. Moreover, this antiquated way of voting and verifying a voter's identity is susceptible to voter fraud, which undermines the integrity of the voting process. In addition, the traditional voting system does not appeal to younger voters, who are increasingly reliant on their mobile devices and more likely to participate in the electoral process if provided with an electronic platform for doing so. Online voting systems have been previously proposed, but many of them suffer from security issues and an inability to verify that each person casting a vote is who they claim to be, and that each voter is only able to vote once. Accordingly, a new system is needed that incorporates the use of now ubiquitous mobile devices to provide increased accessibility, while simultaneously ensuring security.

According to an aspect of one or more exemplary embodiments of the present disclosure, there is provided a mobile voting system that allows for more efficient and secure voter verification, and allows for the voter to vote in-person at the voter's local polling location, or remotely using the voter's mobile device. According to one or more exemplary embodiments, there is provided a voter verification system that allows a voter to verify his or her identity prior to voting, and may include a mobile messaging aggregator configured to receive voter verification requests from one or more mobile carriers, and a mobile voter verification server configured to verify a voter's identity in response to a voter verification request and generate a voter verified code once the voter's identity has been verified. The mobile messaging aggregator may cause a link to the voter verified code to be transmitted to a mobile device of the voter, which when selected by the voter, allows the voter to cast a vote.

The mobile voter verification server may transmit a first request to a voter registrar server with which voters are registered, and may receive a first response indicating whether information contained in the first request corresponds to information stored with the voter registrar server. The mobile voter verification server may generate the voter verified code based on the first response.

The mobile voter verification server may transmit a second request to the voter's mobile carrier billing system, and may receive a second response indicating whether information included in the second request corresponds to information stored in the mobile carrier's database. The mobile voter verification server may generate the voter verified code based on the second response.

The voter verification server may generate the voter verified code if information received in the first response corresponds to information received in the second response.

The information contained in the first request may include at least one of a mobile telephone number associated with the voter's mobile device from which the voter verification request was received, and a password or personal identification number (PIN). The first response may indicate whether one or more of the mobile telephone number, the password or PIN contained in the first request corresponds to a mobile telephone number, password, or PIN stored with the voter registrar server.

The first response may include bibliographic information of the voter, including one or more of the voter's name, address, and birthdate.

The first response may indicate whether the information contained in the first request corresponds to a voter who is deceased or who has had voting privileges suspended or revoked.

The information contained in the second request may include at least one of a mobile telephone number associated with the voter's mobile device from which the voter verification request was received, a type of the voter's mobile device, and bibliographic information associated with the voter. The second response may indicate whether one or more of the mobile telephone number, the type of the voter's mobile device, and the voter bibliographic information corresponds to a mobile telephone number, mobile device type, and voter bibliographic information stored in the mobile carrier billing system.

The second response may include a name that is stored in the mobile carrier billing system and associated with the mobile telephone number from which the voter verification request was received. The mobile voter verification server may generate the voter verified code based on whether the name in the first response matches the name in the second response.

The link to the voter verified code may only allow the voter to cast a vote if the link is selected within a predetermined length of time after it is transmitted to the mobile device of the voter. The link to the voter verified code may cause a mobile ballot to be displayed on the voter's mobile device.

According to another aspect of one or more exemplary embodiments, there is provided a method of verifying voter identity. The method may include receiving voter verification requests from one or more mobile carriers, verifying a voter's identity in response to a voter verification request, generating a voter verified code once the voter's identity has been verified, and causing a link to the voter verified code to be transmitted to a mobile device of the voter, which when selected by the voter, allows the voter to cast a vote.

The step of verifying the voter's identity may include transmitting a first request to a voter registrar server with which voters are registered, and receiving a first response indicating whether information contained in the first request corresponds to information stored with the voter registrar server. The step of generating a voter verified code may include generating the voter verified code based on the first response.

The step of verifying the voter's identity may also include transmitting a second request to the voter's mobile carrier billing system, and receiving a second response indicating whether information contained in the second request corresponds to information stored with the mobile carrier's database. The step of generating a voter verified code may include generating the voter verified code based on the second response.

The voter verified code may be generated if information received in the first response corresponds to information received in the second response.

The information contained in the first request may include at least one of a mobile telephone number associated with the voter's mobile device from which the voter verification request was received, and a password or personal identification number (PIN). The first response may indicate whether one or more of the mobile telephone number, the password or PIN contained in the first request corresponds to a mobile telephone number, password, or PIN stored with the voter registrar server.

The first response may also include bibliographic information of the voter, including one or more of the voter's name, address, and birthdate. The first response may also indicate whether the information contained in the first request corresponds to a voter who is deceased or who has had voting privileges suspended or revoked.

The information contained in the second request may include at least one of a mobile telephone number associated with the voter's mobile device from which the voter verification request was received, a type of the voter's mobile device, and bibliographic information associated with the voter. The second response may indicate whether one or more of the mobile telephone number, the type of the voter's mobile device, and the voter bibliographic information corresponds to a mobile telephone number, mobile device type, and voter bibliographic information stored in the mobile carrier billing system.

The second response may include a name that is stored in the mobile carrier billing system and associated with the mobile telephone number from which the voter verification request was received. The first response may include a name stored with the voter registrar server that is associated with the mobile telephone number from which the voter verification request was received. The voter verified code may be generated based on whether the name in the first response matches the name in the second response.

The link to the voter verified code may only allow the voter to cast a vote if the link is selected within a predetermined length of time after it is transmitted to the mobile device of the voter. The method may also include the step of causing, upon selection of the link, a mobile ballot to be displayed on the voter's mobile device.

BRIEF DESCRIPTION OF DRAWINGS

FIG. 3 is a flow diagram illustrating a mobile voter verification process according to another exemplary embodiment.

DETAILED DESCRIPTION OF EXEMPLARY EMBODIMENTS

Figure 1:
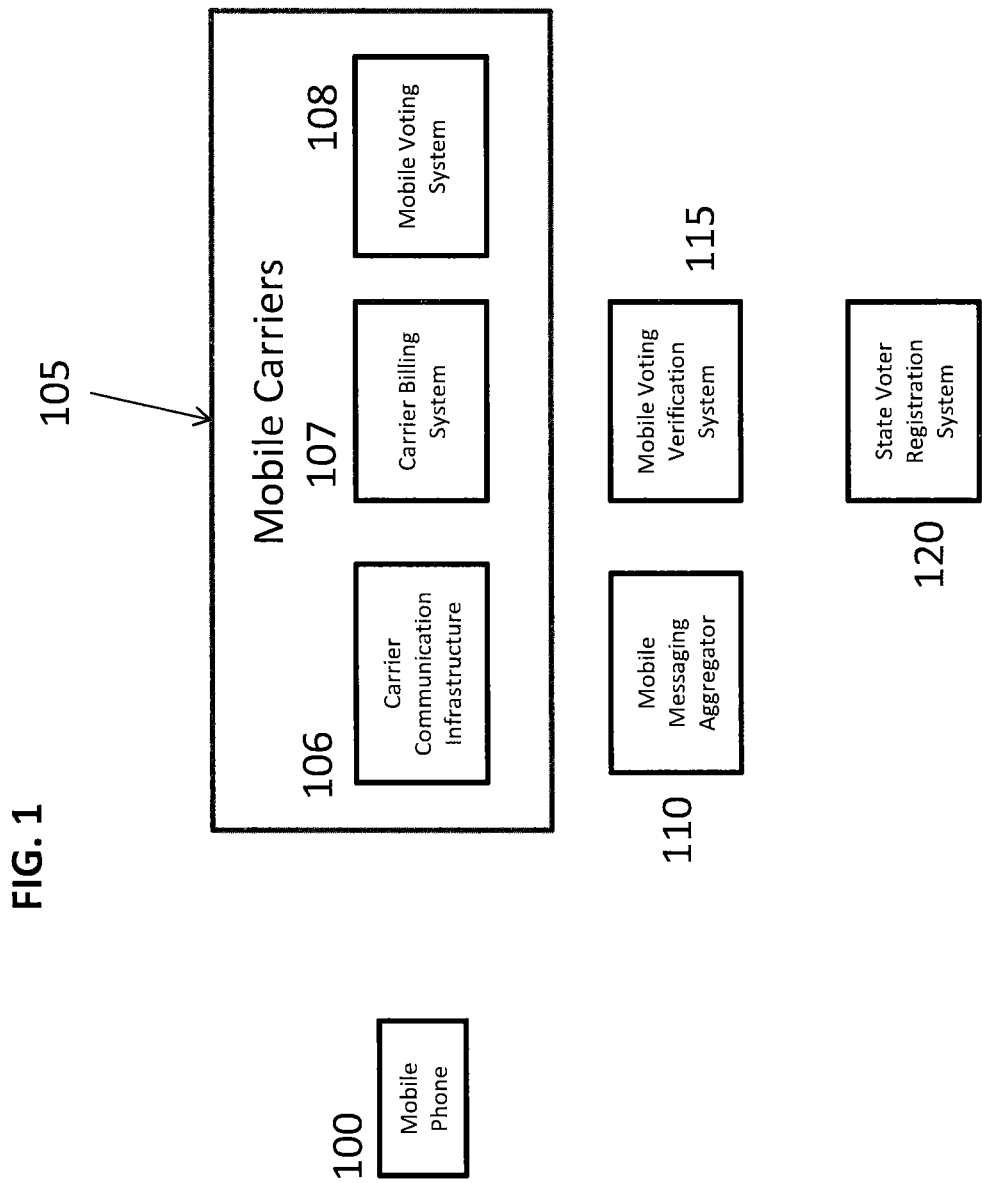
FIG. 1 is a block diagram of a voter verification system according to an exemplary embodiment.

Reference will now be made in detail to the following exemplary embodiments, which are illustrated in the accompanying drawings, wherein like reference numerals refer to like elements throughout. The exemplary embodiments may be embodied in various forms without being limited to the exemplary embodiments set forth herein. Descriptions of well-known parts are omitted for clarity.

FIG. 1 shows various components of the voter verification system according to an exemplary embodiment. The voter verification system according to the exemplary embodiment of FIG. 1 may include a mobile phone 100, which may also be any type of mobile device, mobile carriers 105, a mobile messaging aggregator 110, a mobile voting verification system 115, and voter registrar 120 (which may include a voter registrar server and a voter database), which in this exemplary embodiment is a state voter registration system. Each of the mobile carriers 105 may include a carrier communication infrastructure 106, a carrier billing system 107, and a mobile voting system 108. The various components of the voter verification system may communicate with each other, as described below, using various networks, such as the Internet.

In accordance with the exemplary system, a voter registers with a voter registrar 120 to create a voter record in a voter database. However, the voter registrar 120 is not limited to this exemplary embodiment, and may be the State Department of the United States, the office of the Secretary of State of a particular state, or any other government agency or private entity tasked with maintaining the roster of registered voters. At the time the voter registers with the voter registrar, the voter inputs one or more of: the voter's mobile telephone number, mobile billing information, and a password or personal identification number (PIN). For voters that are already registered to vote, they may update their voter registration by providing their mobile telephone number, and optionally a password or PIN, to the voter registrar. Existing voters may provide this information in a variety of ways, including via mail, facsimile, electronic mail, or via the voter registrar's website. New or existing voters may also provide additional information to the voter registrar, such as a photograph, fingerprint, signature, and retinal scan of the voter.

In addition, the voter may also register, or create an account, with the voter verification system. In registering for the voter verification system, the voter may provide certain bibliographic information such as the voter's name, address, and birthdate, as well as a personal identification number (PIN). The voter may also provide an electronic signature, for example, by using a stylus or the voter's finger to enter a signature on the voter's smartphone, tablet, etc. As part of the process for registering for the voter verification system according to an exemplary embodiment, the voter may input a passcode that may be provided by the county, city, or state in which the voter lives. For example, the supervisor of elections for the voter's county may send a registration passcode via U.S. mail or by other means to the voter. The voter then may use the passcode to register for the voter verification system, which may not allow the voter to register without a valid passcode.

Figure 2:
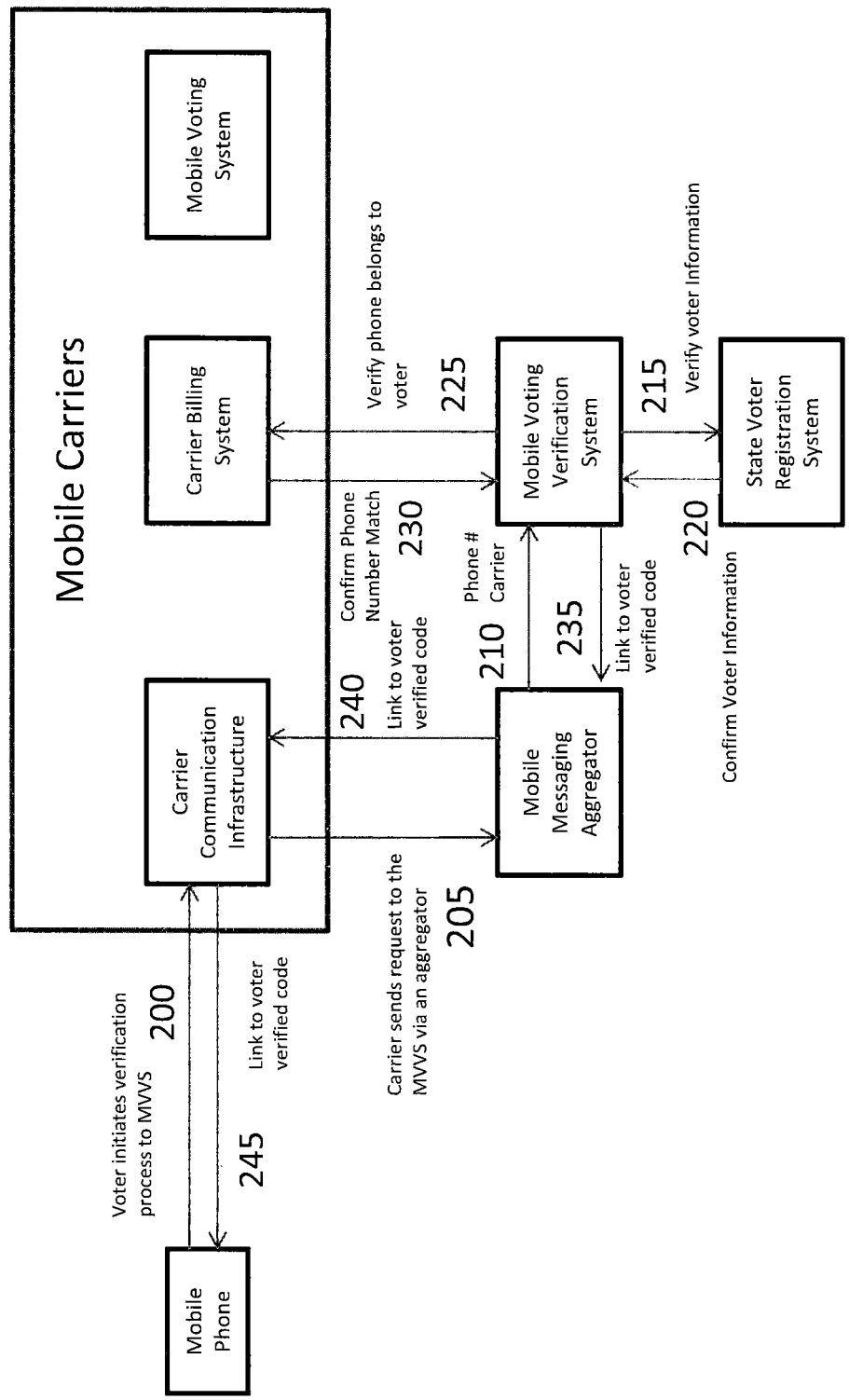
FIG. 2 is a flow diagram illustrating a mobile voter verification process according to an exemplary embodiment.

FIG. 2 shows the process of performing a mobile voter verification according to an exemplary embodiment. The exemplary embodiment of FIG. 2 is explained using the components shown in FIG. 1, however reference numerals for each component are omitted for clarity. According to the exemplary embodiment of FIG. 2, when the user (voter and user are used interchangeably herein) wishes to cast a vote in an election or participate in an early voting process, the voter may initiate the verification process by sending a verification request 200 from the user's mobile phone or device to the voter's mobile carrier communication infrastructure. The verification request may be sent via short message service (SMS) message, or text message, and/or may also be sent to the carrier communication infrastructure via telephone call, social media post, etc. The user may also initiate the request by accessing a website on the user's computer or mobile device. Alternatively, the user may initiate the request via a software application running on the user's mobile device.

Regardless of how the request is initiated, the request may include information identifying the voter, such as the voter's first name. In addition, the request may also include the password or PIN the voter provided to the voter registrar when creating or updating the voter's registration, or the county in which the voter resides. The request may also include the mobile telephone number associated with the user's mobile device from which the request was sent. According to an exemplary embodiment, the mobile phone number may be automatically included in the request by the mobile device, for example, as a mobile phone number is provided when receiving a text message. In addition, according to an exemplary embodiment, the user may also take a photograph of himself or herself and include the photograph in the request. The request may also include a photograph of an identification card, passport, etc., e.g., a driver's license, of the user. A photograph of the user and/or the user's identification card may also include metadata such as the time, location, etc. at which the photograph was taken, which metadata may also be included in the verification request. The verification request may also include the voter's electronic signature, which may be captured via the voter's mobile device. The verification request may also include the voter's location, which may be obtained using a location service on the mobile device, from the mobile carrier, etc. According to an exemplary embodiment, the verification request may also include the voter's address and/or date of birth, which may be entered manually by the user, or may be automatically included by, for example, by a software application that is used to transmit the verification request. For example, when installing the software application on the user's mobile device, the application may request and store certain voter information such as the date of birth and/or address that may be retrieved for inclusion in the verification request.

Upon receiving the verification request, according to an exemplary embodiment, the mobile carrier communication infrastructure may transmit or cause to be transmitted to the user's mobile device one or more images, and a request for a user to identify certain characteristics within the images. For example, the images may contain one more numbers, and the user may be asked to identify the numbers shown in the image(s). Alternatively, the images may be photographs, and the user may be requested to identify which photographs depict a car, tree, etc. The user's response is captured and compared to a predetermined correct answer associated with the images that were provided to the user. If the user's response corresponds to the predetermined correct answer, it may be determined that the verification request was initiated by a human being, as opposed to a computer or other electronic device intended to impersonate a human being.

After determining that the verification request was initiated by a human being, the mobile carrier communication infrastructure in step 205 sends the request to the mobile messaging aggregator. The mobile messaging aggregator aggregates verification requests from one or more mobile carriers and determines the mobile telephone number from which each verification request was received. For example, if the verification request is received via text message, the mobile telephone number may be included within the text message requesting verification. Alternatively, the user may provide the user's mobile telephone number during registration for the mobile voting system, which may occur prior to submitting the verification request. Additional methods of determining the mobile telephone number may also be used, which would be understood by one skilled in the art.

At step 210, the mobile messaging aggregator sends the verification request, including the mobile telephone number, and optionally the voter's password or PIN, to the mobile voting verification system. According to an exemplary embodiment, the mobile carrier communication infrastructure may transmit the verification request directly to the mobile voting verification system. The mobile voting verification system may check a log of mobile telephone numbers from which a verification request has been previously received to determine whether the voter has already requested verification to vote. If the mobile telephone number contained in the verification request already appears in the log, the mobile voting verification system may send a rejection signal to the mobile messaging aggregator, indicating that the voter has already voted. If the mobile telephone number contained in the verification request does not appear in the log, the log is updated to include the mobile telephone number, and at step 215, the mobile voter verification system sends a request to the voter registrar server, which includes the mobile telephone number associated with the received verification request. In response to the request from the voter verification system, the voter registrar server determines whether there is a voter record having a mobile telephone number that matches the mobile telephone number associated with the received verification request.

If the voter registrar server determines that there is a voter record having a matching mobile telephone number, the voter registrar server may transmit a confirmation signal at step 220 indicating that the mobile telephone number from which the voter verification request was received, matches a mobile telephone number associated with a voter record stored in the registrar's database. The confirmation signal may include other voter bibliographic information from the voter record, such as the voter's name, address, birthdate, and the like. Before sending the confirmation signal, the registrar server may also determine whether a password or PIN included in the verification request matches the password or PIN associated with the voter record in the registrar's database. Alternatively, the registrar server may transmit the password or PIN associated with the voter record in the registrar's database to the mobile voting verification system, and the mobile voting verification system may determine whether the password or PIN contained in the verification request matches the password or PIN from the registrar's database. If the password or PIN in the verification request matches the password or PIN associated with the voter record, the voter registrar server sends the confirmation signal 220 to the mobile voting verification system indicating that the mobile telephone number is associated with a valid voter registration. If birthdate or address information is included in the request from the mobile voter verification system, the voter registrar server may also determine whether the birthdate or address information included in the request corresponds to birthdate and address information of the voter record having the telephone number that matches the mobile telephone number from which the request was sent. The voter registrar server may also confirm that the voter record associated with the mobile telephone number does not correspond to a voter who is deceased or who has had their voting privileges suspended or revoked before transmitting the confirmation signal.

Alternatively, if the mobile telephone number associated with the received verification request does not match a voter record having the same mobile telephone number, the registrar server may send a denial signal to the mobile voting verification system at step 220. In addition, if a password or PIN, birthdate, and/or address included in the verification request does not match password or PIN, birthdate, and/or address associated with a voter record in the registrar's database, the registrar server may send a denial signal to the mobile voting verification system at step 220. Moreover, if the voter registrar server determines that the voter record associated with the mobile telephone number corresponds to a voter who is deceased or who has had their voting privileges suspended or revoked, the registrar server may send a denial signal to the mobile voting verification system at step 220.

In step 225, the mobile voting verification system sends a phone number verification request to the mobile carrier billing system associated with the mobile telephone number from which the voter verification request was received. The phone number verification request may include the mobile telephone number from which the voter verification request was received, mobile device type and any bibliographic data associated with the voter, such as the voter's name and address, etc. The carrier billing system may determine whether the received mobile telephone number matches a mobile telephone number in the mobile carrier's database. The carrier billing system may also determine whether the bibliographic information received from the mobile voting verification system matches the bibliographic billing information contained in the mobile carrier's billing system. If the received mobile telephone number and bibliographic information match the mobile telephone number and bibliographic information in the mobile carrier's billing system, in step 230 the carrier billing system sends a carrier confirmation signal to the mobile voting verification system indicating a match. Alternatively, if the received telephone number and/or bibliographic information do not match the mobile telephone number and bibliographic information in the mobile carrier's billing system, the carrier billing system may send a denial signal at step 230. Though steps 215 and 220 are described herein before steps 225 and 230, the verification requests 215 and 225 may be sent to the voter registrar server and carrier billing system, respectively, simultaneously. Alternatively, even if verification requests 215 and 225 are not sent simultaneously, it is not necessarily required that the mobile voting verification system wait to receive the confirmation signal from the voter registrar in step 220 before sending the phone number verification request 225.

Alternatively, the mobile carrier billing system may receive a phone number verification request that includes the mobile telephone number from which the voter verification request was received, and determine the name of the account owner corresponding to the mobile telephone number. In step 230, the carrier billing system may transmit the name of, and optionally other identifying information relating to, the account holder associated with the received mobile telephone number. The mobile voting verification system may then compare information received from the mobile carrier billing system in the carrier confirmation signal to voter bibliographic information received from the voter registrar server. If the information from the carrier billing system matches the information from the voter registrar server, the mobile voting verification system may generate a voter verified code. Alternatively, the mobile voting verification system may determine an accuracy score based on the extent to which the information from the carrier billing system matches the information from the voter registrar the server. If the accuracy score exceeds a predetermined threshold, the mobile voting verification system may generate a voter verified code. After the mobile voting verification system receives the carrier confirmation signal in step 230 and the confirmation signal from the voter registration system in step 220 confirming that the mobile phone number is associated with the voter, the mobile voting verification system generates a link to a voter verified code, which is sent to the mobile messaging aggregator in step 235.

According to an exemplary embodiment, the mobile voting verification system may perform an additional verification step before generating the link to the voter verified code. For example, the mobile voting verification system may use facial recognition software to compare a photograph of the user that was submitted with the verification request with a photograph of the user's identification card that was also submitted with the verification request. Alternatively, after receiving the confirmation signals from the mobile carrier billing system and the voter registration system, the mobile voting verification system may request that the user submit a photograph of the user and/or a photograph of the user's identification card. If the facial recognition software determines that the photograph of the user corresponds to the photograph of the user's identification card, the mobile voting verification system may generate the voter verified code. If the facial recognition software determines that the photograph of the user does not sufficiently correspond to the photograph of the user's identification card, the mobile voting verification system may determine that the verification request should be denied.

In addition, to ensure that the photograph of the voter and/or the photograph of the voter identification card was recently taken, the mobile voting verification system according to an exemplary embodiment may determine how long ago the photograph of the user or user's identification card was taken by comparing the metadata of the photograph(s) contained in the verification request with the time at which the verification request was received. For example, the metadata of the user photograph contained in the verification request may include a timestamp indicating the time at which the photograph was taken. If the difference between the time the verification request was received and the time at which the user photograph was taken exceeds a predetermined threshold, the mobile voter verification system may determine that the verification request should be denied. By requiring the user photograph to be taken shortly before the verification request is sent, the system may be able to prevent a fraudulent voter from using an old photograph of the voter he or she is impersonating to achieve verification.

According to an exemplary embodiment, if the user's mobile device is equipped with an infrared camera, the infrared camera may capture an image of the user that shows thermal characteristics of the user to ensure that the voter who is requesting verification is physically present with the mobile device. For example, a fraudulent voter attempting to cast a ballot in the name of a different voter may try to use a photograph of the different voter in an attempt to deceive the system into believing that the different voter is actually requesting verification. However, an infrared camera capturing an image of the photograph would not capture the same thermal characteristics as would be present if the infrared camera captured an image of the different voter who was physically present in front of the infrared camera. Therefore, using an infrared camera may provide additional security by requiring that the thermal characteristics of the image captured by the infrared camera correspond to the thermal characteristics of a live human being.

According to an exemplary embodiment, after receiving the confirmation signals from the mobile carrier billing system and the voter registration system, the mobile voting verification system may request that the user input a PIN. After receiving the PIN from the user, the mobile voting verification system may determine whether the PIN received from the user corresponds to a PIN that was previously provided by the user when registering for the mobile voting verification system. In addition, or alternatively, the mobile voting verification system may also request that the user input the user's signature and/or a photograph of the user's picture identification, e.g., driver's license, passport, etc. The mobile voter verification system may determine whether the signature provided by the user matches a signature provided by the user when registering for the mobile voter verification system. Alternatively, the mobile voter verification system may compare the signature provided by the user to a signature stored within the voter registrar server. For example, the confirmation signal sent in step 220 may include a signature that was provided when the user registered to vote, and that is stored in the voter registrar server. The mobile voter verification system may compare the original signature provided by the user when the user registered to vote, to the signature provided to the mobile voter verification system as an additional layer of authentication. According to yet another exemplary embodiment, if the user's picture identification card includes the user's signature, the mobile voter verification system may determine whether the signature provided by the user corresponds to the signature on the user's picture identification card. According to still another exemplary embodiment, if the user's picture identification card includes a barcode or other type of encoded information, the mobile voter verification system may decode the information contained in the barcode and determine whether the information corresponds to the bibliographic information received from the registrar server and/or the mobile carrier billing system. Alternatively, the mobile voter verification system may capture bibliographic information from the photograph of the user's picture identification card, and determine whether the bibliographic information corresponds to the bibliographic information received from the registrar server and/or the mobile carrier billing system. According to yet another exemplary embodiment, the mobile voter verification system may determine whether information obtained by decoding a barcode on the user's picture identification card corresponds to bibliographic information captured from the photograph of the user's picture identification card. By ensuring that the various pieces of bibliographic information and/or signature of the user correspond to the bibliographic information and/or signature stored in the registrar server and/or the mobile carrier billing system, the mobile voter verification system provides additional voter verification before providing the ballot to the user.

According to an exemplary embodiment, the mobile voter verification system may also determine whether the verification request originated from an approved geographic location. For example, the verification request may include the location of the voter's mobile phone or device at the time the verification request is sent. The mobile voter verification system may determine whether the location of the mobile phone or device indicated in the verification request matches a location contained in a list of approved locations. For example, the mobile voter verification system may determine whether the location of the mobile phone or device contained in the verification request corresponds to the United States. If the mobile voter verification system determines that the location of the mobile phone or device contained in the verification request matches a location contained in the list of approved locations, the mobile voter verification system may determine that the verification request should be granted. If the mobile voter verification system determines that the location of the mobile phone or device contained in the verification request does not match a location contained in the list of approved locations, the mobile voter verification system may determine that the verification request should be denied. Alternatively, the mobile voter verification system may determine whether the location of the mobile phone or device contained in the verification request matches a location contained in a list of disapproved locations. If the mobile voter verification system determines that the location of the mobile phone or device contained in the verification request matches a location contained in the list of disapproved locations, the mobile voter verification system may determine that the verification request should be denied. If the mobile voter verification system determines that the location of the mobile phone or device contained in the verification request does not match a location contained in the list of disapproved locations, the mobile voter verification system may determine that the verification request should be granted.

According to an exemplary embodiment, the mobile voter verification system may also provide an additional verification step of verifying the user's fingerprint. For example, the user's mobile device may include a fingerprint reader that unlocks the user's mobile device by verifying the user's fingerprint. According to an exemplary embodiment, when the user registers for the mobile voter verification system, the user may use the fingerprint reader of the mobile device to capture the user's fingerprint. Upon receipt of the link to the voter verified code in step 235, the mobile voter verification system may ask the user to again submit the user's fingerprint using the fingerprint reader of the user's mobile device. The mobile voter verification system may then compare the fingerprint captured by the fingerprint reader of the mobile device to the fingerprint that the user submitted when registering for the mobile voter verification system. If the captured fingerprint does not correspond to the initial fingerprint submitted at registration for the mobile voter verification system, the system may not allow the link to the voter verified code to be transmitted to the user's device.

Similarly, according to an exemplary embodiment, the mobile voter verification system may conduct a similar verification of the user's retinal scan. If the user's mobile device is equipped with a device that can scan the retina of the user, the mobile voter verification system may request that the user submit a current retinal scan. The system may then compare the retinal scan to a retinal scan that was previously captured and submitted at registration for the mobile voter verification system. By verifying the retinal scan of the user requesting verification, the system is able to prevent fraudulent voters from using someone else's phone to cast a fraudulent ballot.

According to yet another exemplary embodiment, the mobile voter verification system may, after the link to the voter verified code is transmitted in step 235, send the mobile device a text or SMS message containing additional verification information. For example, the message may contain a numerical code, word, phrase, etc. The mobile voter verification system may then request that the user input the additional verification information, e.g. numerical code to provide two factor authentication. For example, if the user is accessing the voter verification system from an application on the user's mobile device, the voter verification system may cause a text message containing a numerical code to be transmitted to the user's mobile device. The user would then access the numerical code in the received text message, and input the numerical code into the voter verification system. If the numerical code input by the user matches the numerical code provided by the voter verification system, the voter verification system allows the link to the voter verified code to be sent to the mobile device.

According to an exemplary embodiment, the mobile voter verification system may also determine whether the user is of voting age by comparing the birthdate contained in the verification request to the date of the election for which the user is requesting verification. For example, if the legal age to cast a vote is 18 years, the mobile voter verification system may determine whether the birthdate contained in the verification request and/or the birthdate contained in the voter registrar server precedes the date of the election by at least 18 years. Alternatively, the voter registrar server may determine whether the user is old enough to vote, and indicate the results of such determination in a confirmation or denial signal transmitted back to the mobile voting verification system.

If the mobile voter verification system determines that the verification request should be granted, in step 240 the mobile messaging aggregator sends the link to the voter verified code to the carrier communication infrastructure of the mobile carrier from which the verification request was received. In step 245, the mobile carrier communication infrastructure transmits the link to the voter verified code to the mobile phone. The link to the voter verified code may be transmitted via a variety of media, including without limitation, SMS message. The link may only be active for a predetermined length of time after it is transmitted to the mobile phone. For example, the link may expire 5 minutes after it is transmitted to the mobile phone, although other expiration periods may be used.

When the voter selects the link, the user may be provided with a code, such as a QR code, bar code, or other type of code, that confirms the voter is a verified voter. If the voter is at the voter's polling location, the voter may scan the received code at a code scanner, such as a QR code scanner, located at the polling location. The code scanner decodes the information encoded within the scanned code to determine which ballot the voter should receive. The code scanner may then display the ballot so that an election official can provide the correct ballot to the voter. Alternatively, scanning the code may cause the electronic voting system at the polling location to display the appropriate ballot for the voter so that the voter can cast his or her vote.

The voter verification system according to the present disclosure may allow for more efficient and secure voter verification. For example, election volunteers would not be required to compare the voter's identification to a roster of voters to verify the voter's identity and determine whether the voter is voting in the correct location. In addition, the voter verification system of the present disclosure reduces the risk of voter fraud that may otherwise occur if the voter fraud is not detected by a visual inspection of the voter's identification card.

In addition to voting at a physical polling location once the voter has been verified, according to an aspect of one or more exemplary embodiments there is provided a mobile verification and mobile voting system that allows the voter to cast the voter's ballot from the voter's mobile device. FIG. 3 illustrates a mobile verification and voting process according to an exemplary embodiment. According to the exemplary embodiment of FIG. 3, the voter verification steps described above with respect to FIG. 2, i.e., steps 200, 205, 210, 215, 220, 225, and 230, and the additional verification steps described prior to step 235, are the same in the exemplary embodiment of FIG. 3, as represented by steps 300, 305, 310, 315, 320, 325, and 330, respectively. A detailed description of these steps in FIG. 3 is not repeated here to avoid redundancy.

After the mobile voting verification system receives the carrier confirmation signal confirming that the mobile phone number is associated with the voter in step 330, the mobile voting verification system generates a link to a mobile voting system, which is sent to the mobile messaging aggregator in step 335. The link to the mobile voting system is sent to the carrier communication infrastructure in step 340, and is then transmitted to the voter's mobile phone in step 345. The link to the mobile voting system may only be active for a predetermined length of time after it is transmitted to the mobile phone. For example, the link may expire five minutes after it is transmitted to the mobile phone, although other lengths of time may be used.

When the voter selects the link, the voter may be provided with a mobile ballot on the voter's mobile phone or other mobile device. The mobile ballot may be provided based on the address provided in the verification request and/or the address contained in the voter registrar server to ensure that the voter is provided with a ballot that corresponds to the voter's address. According to an exemplary embodiment, prior to providing the voter with a mobile ballot, the voter verification system may also verify that the voter's mobile phone has an internet protocol (IP) address that corresponds to an approved carrier domain. For example, when the voter selects the link, the IP address of the voter's phone may be transmitted to the mobile voter verification system, which determines whether the IP address indicates a mobile carrier domain that matches a carrier domain contained on a list of approved domain carriers that may be stored at the mobile voter verification system. If the mobile carrier domain indicated by the IP address matches an approved carrier domain, a mobile ballot is provided to the voter on the voter's mobile phone or device, and the voter is then able to cast votes using the mobile ballot. If the mobile carrier domain indicated by the IP address does not match an approved carrier domain, the mobile ballot may not be provided to the voter's mobile phone or device, and the voter is unable to vote using the mobile ballot. Alternatively, the mobile ballot may be provided to the voter's mobile phone or device for review purposes only, but the voter may not be allowed to vote using the mobile ballot if the mobile carrier domain indicated by the IP address does not match an approved carrier domain.

According to exemplary embodiment of FIG. 3, each carrier may have a mobile voting system within its network. The voting system may only be accessible by a mobile device on each carrier's network. The mobile voting system of the exemplary embodiment may be configured so that mobile devices will only use their carrier's voting system to place their votes. Each carrier's mobile voting system may contain a database of all the possible ballots. Alternatively, a centralized mobile voting system may be used that is independent of the voter's mobile carrier. Once a voter is verified the proper ballot is digitally generated and presented on the voter's mobile device. Voters can view and change any candidate or initiative before submitting their final ballot. Completed ballots may be stored anonymously in the carrier's mobile voting system. All communication during the voting process between the voting system and mobile device is preferably encrypted, and may be encrypted using a variety of encryption methods. Completed ballots are transmitted to the proper election authorities either electronically or manually based on the capabilities of each district.

According to an exemplary embodiment, the verification request may be a request to participate in early voting. In this embodiment, the mobile voting system may update the voter regarding the status of the voter's early voting request. For example, after receiving the verification request to participate in early voting, the mobile voting system may transmit an acknowledgment back to the user indicating that the request has been received. In addition, after the voter casts his or her early mobile ballot, the mobile voting system may transmit a message to the user's mobile device indicating that the early mobile ballot has been received. The mobile voting system may also transmit a message to the voter's mobile device that the voter's early ballot has been counted. The mobile voting system may also inform voters if there is a problem with the voter's early ballot. For example, if the early ballot has been challenged by a government election official, the mobile voting system may transmit a message to the user's mobile device indicating that the voter should contact an appropriate government agency to resolve the challenge. In an embodiment in which the voter is required to provide a photograph of the voter's identification card, or an electronic signature, the mobile voting system may notify the voter if the photograph of the identification card is not sufficiently clear or the electronic signature is not sufficiently legible.

According to an exemplary embodiment, the voter verification system may also store a record of the voter's ballot that was transmitted to election authorities. After submitting the final ballot, the voter may request that the voter verification system provide a copy of the voter's final ballot so that the voter can verify that the voter's selections were accurately reflected. Upon receipt of such a request from the voter, the voter verification system of the exemplary embodiment may directly or indirectly transmit the voter's stored final ballot to the voter's mobile device. Accordingly, the voter may be more confident that the voter's ballot was accurately submitted by the voter verification system.

The mobile messaging aggregator and mobile voting verification system may be embodied, for example, as a software or hardware component, such as a Field Programmable Gate Array (FPGA) or an Application Specific Integrated Circuit (ASIC), which performs certain tasks. One or both of the mobile messaging aggregator and mobile voting verification system may be configured to reside in an addressable storage medium and to execute on one or more processors. Thus, the mobile messaging aggregator and/or mobile voting verification system may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components may be combined into fewer components or further separated into additional components. In addition, the components may be implemented so as to execute on one or more Central Processing Units (CPUs) in a device.

Although the inventive concepts of the present disclosure have been described and illustrated with respect to exemplary embodiments thereof, it is not limited to the exemplary embodiments disclosed herein and modifications may be made therein without departing from the scope of the inventive concepts.

What is claimed is:

1. A mobile voting system comprising:
one or more processors configured to execute instructions stored in a memory, which when executed by said one or more processors perform steps comprising:
receiving a voter verification request, said voter verification request including a first mobile telephone number from which the voter verification request was received;
transmitting a first request containing said first mobile telephone number to a first server containing voter registration information, and receiving a first response containing information stored in the first server that corresponds to the first mobile telephone number;
transmitting a second request containing said first mobile telephone number to a second server containing mobile carrier information, and receiving a second response containing information stored in the second server, which information corresponds to the first mobile telephone number;
determining that an identity of the voter is verified based on information received in the first response corresponding to information received in the second response; and
in response to determining that the identity of the voter is verified, transmitting, directly or indirectly, a link to a mobile device of the voter;
wherein the link is configured to provide a mobile ballot corresponding to the voter's identity.

2. The mobile voting system of claim 1, wherein the information contained in the first request includes at least one of a password and a personal identification number (PIN); and
wherein the first response indicates whether one or more of the password or PIN contained in the first request corresponds to a password or PIN stored with the first server.

3. The mobile voting system of claim 1, wherein the first response further comprises bibliographic information of the voter, including one or more of the voter's name, address, and birthdate.

4. The mobile voting system of claim 1, wherein the verifying the identity of the voter comprises:
receiving a first personal identification number (PIN);
comparing the first PIN to a second PIN that was previously provided by the voter; and
verifying the identity of the voter if the first PIN corresponds to the second PIN.

5. The mobile voting system of claim 4, wherein verifying the identity of the voter further comprises:
receiving a first voter signature;
comparing the first voter signature to a second voter signature that was previously provided by the voter; and
verifying the identity of the voter if the first voter signature corresponds to the second voter signature.

6. The mobile voting system of claim 4, wherein verifying the identity of the voter further comprises:
receiving an image of an identification card of the voter;
capturing voter bibliographic information from the image of the identification card; and
verifying the identity of the voter if the bibliographic information captured from the image of the identification card corresponds to the information received in at least one of the first response and second response.

7. The mobile voting system of claim 4, wherein verifying the identity of the voter further comprises:
receiving an image of an identification card of the voter;
capturing encoded information from the image of the identification card; and
verifying the identity of the voter if the encoded information captured from the image of the identification card corresponds to the information received in at least one of the first response and second response.

8. The mobile voting system of claim 4, wherein verifying the identity of the voter further comprises:
receiving at least one image of an identification card of the voter;
capturing encoded information and voter bibliographic information from the at least one image of the identification card; and
verifying the identity of the voter if the encoded information captured from the image of the identification card corresponds to the bibliographic information captured from the image of the identification card.

9. The mobile voting system of claim 1, wherein the information contained in the second request includes at least one of a type of the voter's mobile device from which the voter verification request was received and bibliographic information associated with the voter; and
wherein the second response indicates whether one or more of the type of the voter's mobile device and the voter bibliographic information contained in the second request corresponds to one or more of a mobile device type and voter bibliographic information associated with the first mobile telephone number that is stored in the second server.

10. The mobile voting system of claim 1, wherein the second response includes a name that is stored in the second server and is associated with the first mobile telephone number;
wherein the first response includes a name stored with the first server that is associated with the first mobile telephone number; and
wherein the link is transmitted to the mobile device of the voter based on whether the name in the first response matches the name in the second response.

11. The mobile voting system of claim 1, wherein the voter verification request includes a photograph of the voter and a photograph of an identification card of the voter; and
wherein verifying the identity of the voter comprises determining whether the photograph of the voter corresponds to the photograph of the identification card of the voter.

12. A mobile voting method, the method comprising:
receiving a voter verification request, said voter verification request including a first mobile telephone number from which the voter verification request was received;
transmitting a first request containing said first mobile telephone number to a first server containing voter registration information;
receiving a first response containing information stored in the first server that corresponds to the first mobile telephone number;
transmitting a second request containing said first mobile telephone number to a second server containing mobile carrier information;
receiving a second response containing information stored in the second server, which information corresponds to the first mobile telephone number;
determining that an identity of the voter is verified based on information received in the first response corresponding to information received in the second response; and
in response to determining that the identity of the voter is verified, transmitting, directly or indirectly, a link to a mobile device of the voter, wherein the link is configured to provide a mobile ballot corresponding to the voter's identity.

13. The method of claim 12, wherein the information contained in the first request includes at least one of a password and a personal identification number (PIN); and
wherein the first response indicates whether one or more of the password or PIN contained in the first request corresponds to a password or PIN stored with the first server.

14. The method of claim 12, wherein the first response further comprises bibliographic information of the voter, including one or more of the voter's name, address, and birthdate.

15. The method of claim 12, further comprising:
receiving a first personal identification number (PIN); and
comparing the first PIN to a second PIN that was previously provided by the voter;
wherein the identity of the voter is verified if the first PIN corresponds to the second PIN.

16. The method of claim 15, further comprising:
receiving a first voter signature; and
comparing the first voter signature to a second voter signature that was previously provided by the voter; and
wherein the identity of the voter is verified if the first voter signature corresponds to the second voter signature.

17. The method of claim 15, further comprising:
receiving an image of an identification card of the voter; and
capturing voter bibliographic information from the image of the identification card; and
wherein the identity of the voter is verified if the bibliographic information captured from the image of the identification card corresponds to the information received in at least one of the first response and second response.

18. The method of claim 15, further comprising:
receiving an image of an identification card of the voter; and
capturing encoded information from the image of the identification card;
wherein the identity of the voter is verified if the encoded information captured from the image of the identification card corresponds to the information received in at least one of the first response and second response.

19. The method of claim 15, further comprising:
receiving at least one image of an identification card of the voter; and
capturing encoded information and voter bibliographic information from the at least one image of the identification card;
wherein the identity of the voter is verified if the encoded information captured from the image of the identification card corresponds to the bibliographic information captured from the image of the identification card.

20. The method of claim 12, wherein the information contained in the second request includes at least one of a type of the voter's mobile device from which the voter verification request was received and bibliographic information associated with the voter; and
wherein the second response indicates whether one or more of the type of the voter's mobile device and the voter bibliographic information contained in the second request corresponds to one or more of a mobile device type and voter bibliographic information associated with the first mobile telephone number that is stored in the second server.

21. The method of claim 12, wherein the second response includes a name that is stored in the second server and is associated with the first mobile telephone number;
wherein the first response includes a name stored with the first server that is associated with the first mobile telephone number; and
wherein the link is transmitted to the mobile device of the voter based on whether the name in the first response matches the name in the second response.

22. The method of claim 12, wherein the voter verification request includes a photograph of the voter and a photograph of an identification card of the voter; and
wherein verifying the identity of the voter comprises determining whether the photograph of the voter corresponds to the photograph of the identification card of the voter.

* * * * *